US008332524B2

(12) United States Patent
Garfinkle et al.

(10) Patent No.: US 8,332,524 B2
(45) Date of Patent: Dec. 11, 2012

(54) INFORMATION ON DEMAND PROCESS FRAMEWORK TO GENERATE, MANAGE, SECURE, AND DEPLOY BROWSERS AND APPLICATION ACCESSIBLE WEB SERVICES

(75) Inventors: Steven M. Garfinkle, Cold Spring, NY (US); Jamshid A. Vayghan, North Oaks, MN (US)

(73) Assignee: International Business Machines Corporation, Armonk, NY (US)

(*) Notice: Subject to any disclaimer, the term of this patent is extended or adjusted under 35 U.S.C. 154(b) by 863 days.

(21) Appl. No.: 11/873,613

(22) Filed: Oct. 17, 2007

(65) Prior Publication Data
US 2009/0106431 A1    Apr. 23, 2009

(51) Int. Cl.
*G06F 15/16* (2006.01)
(52) U.S. Cl. ............ 709/229; 709/223; 709/227; 726/9; 713/159; 713/172
(58) Field of Classification Search .......... 709/223–226, 709/227–229
See application file for complete search history.

(56) References Cited

U.S. PATENT DOCUMENTS

| 2003/0055624 | A1* | 3/2003 | Fletcher et al. ................. 704/2 |
| 2005/0044197 | A1* | 2/2005 | Lai ................................ 709/223 |
| 2005/0262194 | A1 | 11/2005 | Mamou et al. |
| 2006/0165040 | A1 | 7/2006 | Rathod et al. |
| 2009/0089039 | A1* | 4/2009 | Shufer et al. .................... 703/23 |
| 2009/0089131 | A1* | 4/2009 | Moukas et al. ................... 705/8 |

OTHER PUBLICATIONS

Harry M. Sneed, "Wrapping Legacy Software for Reuse in a SOA", Dec. 2005 http://citeseerx.ist.psu.edu/viewdoc/summary?doi=10.1.1.87.1642.*

* cited by examiner

*Primary Examiner* — Ian N Moore
*Assistant Examiner* — Jackie Zuniga
(74) *Attorney, Agent, or Firm* — Cahn & Samuels, LLP; Louis J. Percello, Esq.

(57) ABSTRACT

Disclosure is a method and system for delivering a reusable framework. The disclosure invokes an interface to define an information service within the reusable framework. The defined information service is stored in a repository. The method further includes outputting a service request as an address for invoking the defined information service and establishing a data connection after receiving the service request wherein the defined information service can be invoked.

17 Claims, 4 Drawing Sheets

INFORMATION ON DEMAND PROCESS FRAMEWORK TO GENERATE, MANAGE, SECURE, AND DEPLOY BROWSERS AND APPLICATION ACCESSIBLE WEB SERVICES

FIELD OF THE INVENTION

Disclosure is a method and system for delivering a reusable framework. The disclosure invokes an interface to define an information service within the reusable framework. The defined information service is stored in a repository. The method further includes outputting a service request as an address for invoking the defined information service and establishing a data connection after receiving the service request wherein the defined information service can be invoked.

BACKGROUND

U.S. Patent 2005/0262194 application discloses a related user interface, or a component of a user interface that is deployed as a service in a services oriented architecture for use, for example, in a data integration platform.

U.S. Patent Application 2006/0165040 discloses a communication system, method and standards for convergence solution to prevailing communication technologies & concepts includes rich client enabled, service oriented distributed information computation and communication (ICC) framework. The distributed network comprises of plurality of clients at specified level of operation in the framework architecture essentially following TFHL networking standards for secured information management identified as NetAlter framework and said distributed framework (NetAlter) comprising of the Service Browser Application for accessing the ICC framework contents in plurality of ways including peer to peer, offline, online etc. irrespective of operating system in use and location parameter.

The SOA Summit paper describes a self-service delivery solution that is built on a service-oriented framework. The proposed solution is an integration of assets and products based on a service oriented architecture (SOA) and Web services interfaces. The proposed solution supports the full life cycle of a service delivery from order placement through final reporting and billing.

SUMMARY OF THE INVENTION

An exemplary feature of this disclosure is a method of delivering a reusable framework. The method consists of invoking an interface to define an information service, storing the defined information service in a repository, outputting a service request as an address for invoking the defined information service, and establishing a data connection after receiving the service request wherein the defined service can be invoked as part of the reusable framework.

A further exemplary feature of this disclosure is a method that returns results of data to a data request end-point in format specified in the defined information service as part of the reusable framework.

Another exemplary feature of this disclosure is a method that invokes the interface in a service oriented architecture as part of the reusable framework Yet another exemplary feature of this disclosure is a method which adds additional functionality to the results of data to allow for new data formats as part of the reusable framework.

Another exemplary feature of this disclosure is a method which stores the defined information service in a metadata repository as part of the reusable framework A further exemplary feature of this disclosure is a method which defines the defined service as a web service as part of the reusable framework.

Yet another exemplary feature of this disclosure is a method where a controller receives the data service request, a service controller which parses the data service request, the service controller references the defined information service, and the service controller packages and brokers resulting information from the data service request and the referenced the defined information service to a routing module as part of the reusable framework.

Another exemplary feature of this disclosure is a method of enabling a services oriented architecture to return the results of the data to the data request end-point in the format specified in the defined information service as part of the reusable framework.

Another exemplary feature of this disclosure is a method of determining required security in the defined information service and implementing the required security as part of the reusable framework.

Yet another exemplary feature is a method of accessing multiple data sources in the reusable framework.

Yet another exemplary feature is a method of defining the defined information service using non-computer coded parameters in the reusable framework.

Another exemplary feature is a method of creating a standard message mapping of messages in the reusable framework.

Still another exemplary feature is a method of logging the data service requests in a reusable framework.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The foregoing and other features, aspects, and advantages will be better understood from the following non-limiting detailed description of preferred embodiments of the disclosure with reference to the drawings that include the following.

DETAILED DESCRIPTION

Figure 1:
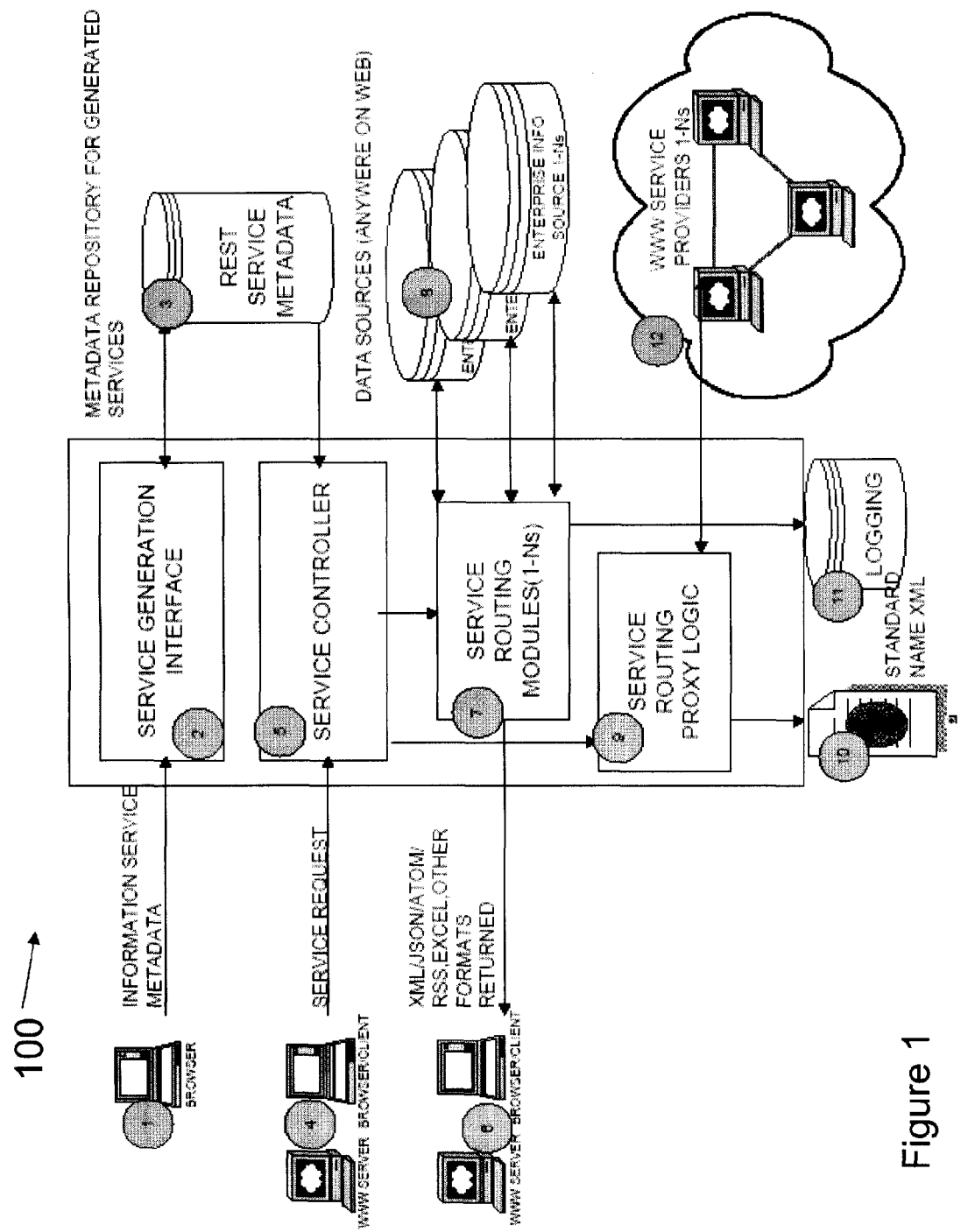
FIG. 1 illustrates an overall flow of a logical environment for automatic generation of information services from an end-user and service creator perspective.

Within the current business climate there is a voracious demand for information to help improve operations, save money and increase revenue. This demand rises from all aspects of commerce, spans all geographic locations and includes many methods of information distribution. Data alone is not enough to drive the needs of growing businesses, this data needs to be made into actionable information and be delivered to the right people at the right time. In order to achieve the previously stated goals information assets need to be accessible, accurate, easily understood, and be re-usable. These attributes significantly aid in an organizations ability to compete in the marketplace.

Business domain knowledge must be transferred into structures that are usable by systems and people. Tools that analyze existing legacy data that help determine its structure and purpose need to be implemented into service environments. These tools could analyze data and automatically create usable interfaces that either system to system or end-users can interact with. Tools that apply search engine technology to discover needed metrics from information repositories also need to be incorporated into the "information as a service" environment.

The ability to create information metrics based on a request by an end user or system without pre-built results is also a criteria for information as a service. Information must also be secured in accordance business rules and external rules. Being able to protect information assets is as critical as being able to provide information. To truly become an "information as a service" provider especially coming from a non-service environment the enterprise needs to apply automatic data mining, automatic analysis and discovery to help create usable information.

Disclosed is a method and system for developing information on demand process framework to generate, manage, secure, and deploy browsers and application accessible web services to connect to distinct data sources as a middle-ware web services layer.

The disclosure delivers a re-usable framework that enables an end user to turn traditional "data access points" into web service functions with no code. These services are useable in applications and direct access through browsers or client systems and can be embedded in situational, mashup and any web connected application. This framework leverages metadata, parameterization to allow an application environment to simply define a data connect, a request for services, embed sql to return result sets of information to requestors. These requesters can either be applications, appliances, or end-users.

By implementing this framework, exposing traditional data as web services is quick and easy. The disclosure helps to support the Information On Demand Strategy and will help achieve revenue growth and operational savings. The framework provides a fast a cost effective methods for converting legacy information environments into SOA and web service enabled enterprise infrastructures.

FIG. 1 illustrates the information on demand framework to generate, manage, secure, and deploy browser and application accessible web services. Proper execution of the described elements through the framework will enable the disclosure to bring services oriented architecture to traditional information technology. The framework wraps an SOA layer around any data source regardless of hosting format. The services generated in this framework implements information as a service. This framework effectively exposes traditional data as web services and quickly enables an enterprise to leverage SOA implementations. There is no coding needed to create a web service within this disclosure. A user of the framework quickly creates a service by supplying parameters using a graphical interface, upon completing the questions posed in the interface the services ready to deploy.

Figure 2:
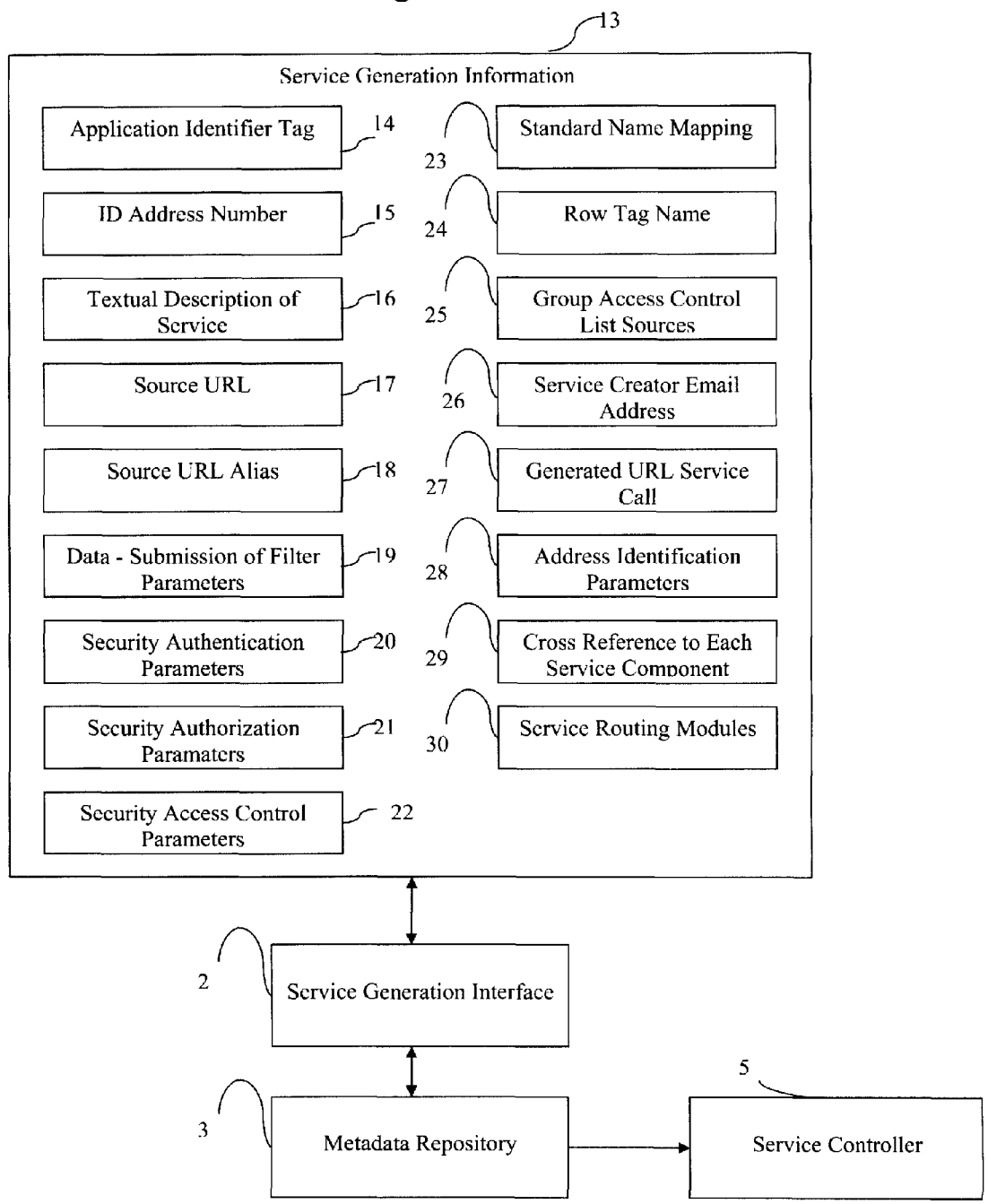
FIG. 2 illustrates service generation in which service parameters and functions are defined.

Now referring to FIGS. 1 and 2, illustrated are the processes and activities associated with defining a web service 100. This process illustrates all the parameters and functions that are defined of the service being constructed.

An individual needing to define a web service for a data or information requests invokes a web enabled service generation interface 2 via a browser or client 1 connected the internet. Upon invoking the interface 2 the user is presented with options to define the service using English-language parameters, non-computer coded instructions. As a result, there is no coding needed to create a web service.

A user of the framework quickly creates a service by supplying parameters 13 using a service generation interface 2 upon completing the questions posed in the interface the services ready to deploy. The following information is collected to define the parameters and functions of the service being constructed: An Application identifier tag 14 used to denote an application name; ID Address number 15 for system identification; A textual description of the service 16 for documentation purposes; A source URI 17 to define the location of the service; A source URI alias 18 in the event that there is a need to mask the actual server address; The ability to select the appropriate "Service Routing Modules" 30; Definition area 19 to specify the actual data required with the capability of adding filter parameters to make the generated services reusable for differed data filter criteria; Security Authentication parameter 20 for LDAP validation, Security Authorization parameter 21 for Entitlement to access specific data; Security Access Control Parameter 22; Standard Name Mapping 23 used for common message mapping; Row Tag Name 24 to specify a name tag for each returned row of information; Group Access Control List sources 25 to specify secured user group access to the service being defined; Service Creator email address 26; The generated URL service call 27 to be used in application; Address Identification Parameters 28 for the traditional data sources; and cross reference listing of every component that calls the service 29 this gets updated after the service is deployed for traceability. This service generation interface 2 masks the complexity in accessing and securing information assets to environments such as situational application construction frameworks.

Requests are made in the form of URLs that are originally defined within the user interface 2 component. The generated URLs contain parameters that indicate the location of the service, security tokens and data filters.

All information describing the generated service is stored in the Metadata Repository 3 this information in referenced when service call URL's are invoked into the framework. This framework leverages metadata 3 parameterization to allow an application environment to simply define a data connect, a request for services, embed sql to return result sets of information to requestors 7. Parameters 13 are referenced using detailed information that is stored in the Metadata Repository 3. This repository 3 contains and captures information which provides attributes needed to automatically construct web services. The web services created with this disclosure request, extract and deliver information to consumers and applications. The Metadata Repository 3 drives the creation and behavior of the web services that are generated with this disclosure. A World Wide Web browser enabled application acts as an interface into a metadata repository 3. This metadata repository 3 contains and captures various parameters that instruct a series of API to automatically construct web service calls to request, extract and deliver information data assets to end consumers and applications. These consumers and applications area connected to the World Wide Web.

Once parameters 13 are stored a series of processes are invoked to execute information deliver in the form of isolated web services request 4. The service request 4 is a web service call structured in the form of a URL. This URL contains information that is parsed by the Service Controller 5. The URL services calls are either posted directly in any browser type or any client that is connected to the internet. Once the service URL is posted on the interned the Service Controller 5 is alerted.

Figure 3:
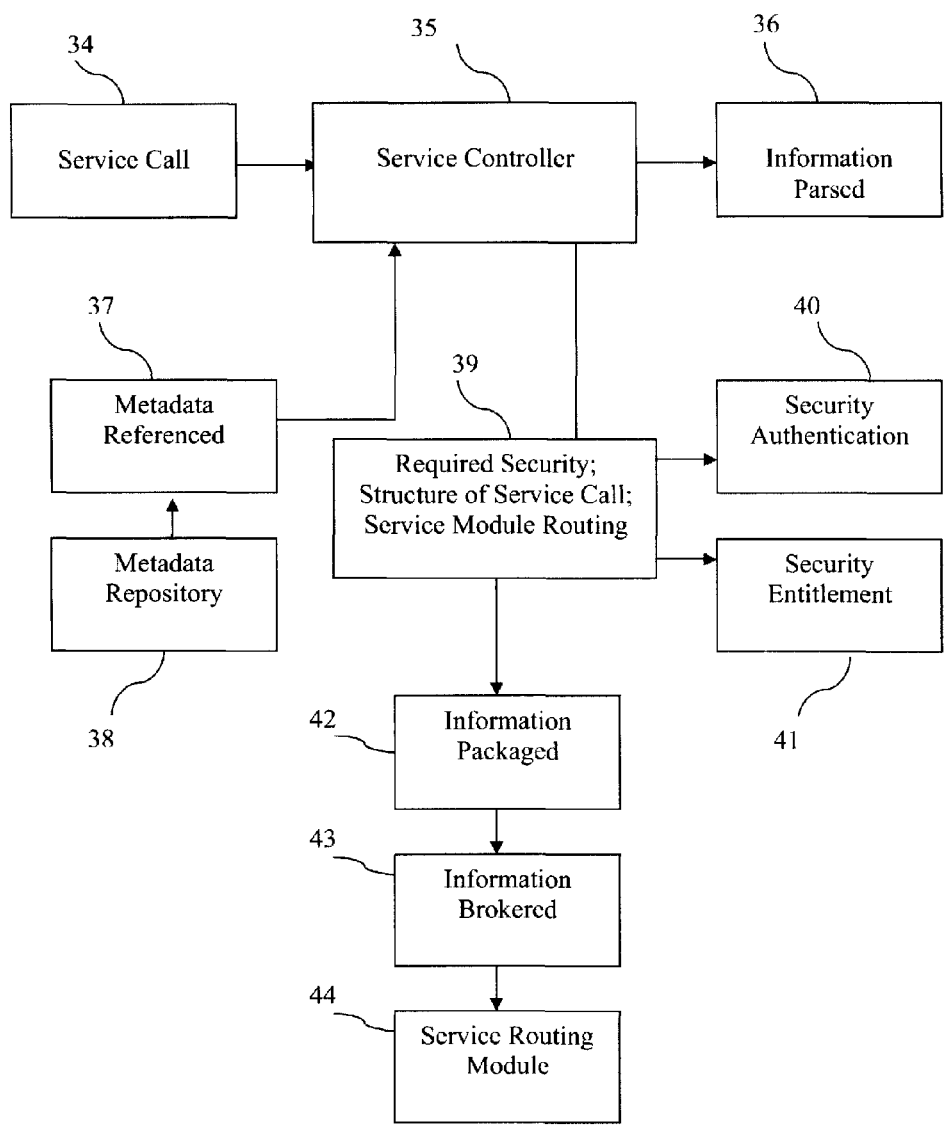
FIG. 3 illustrates a service controller in a reusable framework according to an embodiment of the present disclosure.

FIG. 3 illustrates a service controller 35 in a reusable framework according to an embodiment of the present disclosure. These services are useable and reusable in applications and direct access through browsers or client systems and can be embedded in situational, mashup and any web connected application. These requesters 4 of the reusable framework can either be applications, appliances, or end-users.

The Service Controller 35 directs the process once the URL is invoked on the web. The Service Controller 35 receives the URL or header 34 and parses out the information passed 36. The Service Controller 35 then searches and references the Metadata 37. The Service Controller 35 then acts as a broker to determine were the request needs to be routed. Determination paths include routing to specific Service Routing Modules 44. The resulting information is then packaged 42 and brokered 43 to a specific Service Routing Module 44. The Service Controller 35 is essentially a broker that determines the required security 39, the structure of the service call 39, and Service Module Routing 39. The Service Controller implements any of the defined security such as authentication 40 and entitlement 41, thus protecting access to the actual information to only authorized requests. This allows the framework to have the ability to secure and protect the information that is being requested. Capabilities in security include authentication 40 and authorization or entitlement 41. With authentication 41, the generated service can be directed to ensure that the user requesting information is a valid resource. Access control lists 25 can be applied to specific services to secure information request by individuals, teams and system resources.

Figure 4:
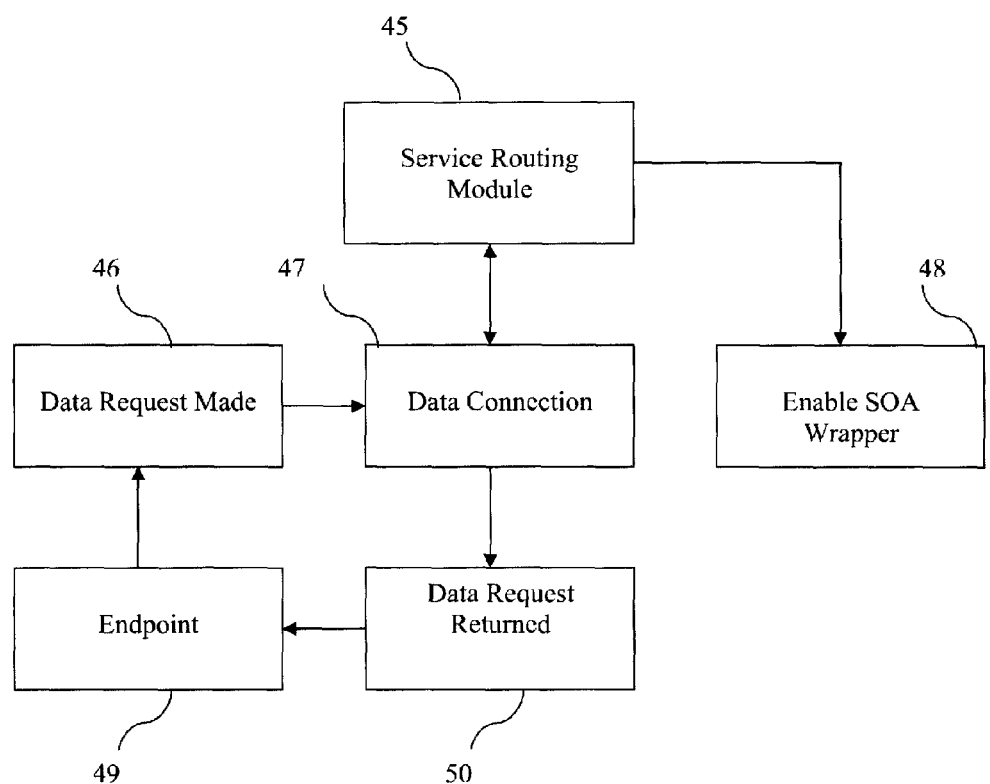
FIG. 4 illustrates a service routing module in a reusable framework according to an embodiment of the present disclosure.

Referring to FIG. 4, and to FIG. 1 again, once the Service Controller 5 routes to the correct Service Routing Module 45, a data connection 47 is established, requests for data are made 46 and returned 50 back to the requesting end-point 49 in a format that is specified in the URL. Service Routing Modules 45 contain specific logic that organizes the type of processing that needs to occur to complete the request. These formats may include XML; News feed formats, spreadsheets, text data, JavaScript Object Notation, or additional formats.

The architecture is configured to allow for new formats as they become available. In addition, new Service Routing Modules can be added for increased functions, current functions include the ability to set up proxy servers, cluster additional servers for growth, and the ability to access different information sources. The Service Routing Modules also enable the SOA wrapper 48 around the traditional data information sources, effectively getting access to the data, executing requests and returning results of information via SOA service calls. The Service Routing Modules 48 wraps an SOA layer around any data source 8 regardless of hosting format. The Service Routing Modules 48 can also create proxies, execute logging, formats result sets, negotiates between different versions of information sources, The Service Routing Modules 48 help to format requested formats.

Returned information via the service URL call is sent back to the requesting end-point 7.

Actual data or information sources 8, which can be in any format located anywhere on an internet network.

A Service Routing Module 6 creates a proxy server 9 to mask actual server addresses and to cluster other servers for growth. The proxy component 9 helps to establish a common nomenclature and framework for integrating this environment with other service providers which can be on any web infrastructure including intranet or internet environments. The service proxy 9 enables a central point with a common nomenclature for grouping and accessing these generated services with service that are provide by external providers.

A standard mapping of messages 10 is created in the event that standards are not implemented in message interactions. By creating this mapping interface messages can be standardized with minimal impact to the framework, thus preserving generic capabilities.

Usage logging 11 tracks usage of this framework. Service calls are tracked to log usage, this could be used to charge back requestors for CPU and data access from a services oriented implementation.

Again referring to FIG. 1, the present disclosure allows for the clustering of other servers or service providers 12.

It is to be understood that the provided illustrative examples are by no means exhaustive of the many possible uses for my disclosure.

From the foregoing description, one skilled in the art can easily ascertain the essential characteristics of this disclosure and, without departing from the spirit and scope thereof, can make various changes and modifications of the disclosure to adapt it to various usages and conditions.

It is to be understood that the present disclosure is not limited to the embodiments described above, but encompasses any and all embodiments within the scope of the following claims:

We claim:

1. A method of delivering a reusable framework, said method comprising:
    invoking an interface to define an information service within said reusable framework;
    storing said defined information service and parameters of the defined information service in a metadata repository, wherein the parameters comprise:
        a security authentication parameter for LDAP validation,
        a security authorization parameter for entitlement to access specific data,
        a security access control parameter, and
        address identification parameters for the data sources;
    outputting a service request as a URL address for invoking said defined information service, the URL address including a location of the defined information service and security tokens;
    establishing a data connection after receiving said service request wherein said defined information service can be invoked, said establishing of the data connection includes accessing multiple data sources;
    wrapping a SOA wrapper around the data sources to access the data sources, execute requests, and return results of data via SOA service calls, the SOA wrapper being wrapped around the data sources regardless of hosting format;
    automatically generating a web service in response to the service request based on the parameters of the defined information service in the metadata repository; and
    returning the results of data to a data request end-point in a format specified in the URL address.

2. The method of claim 1, further comprising invoking said interface in a service oriented architecture.

3. The method of claim 1, further comprising adding additional functionality to said results of data to allow for new data formats.

4. The method of claim 1, further comprising:
    a service controller receiving said service request;

said service controller parses said service request;
said service controller references said defined information service; and
said service controller packages and brokers resulting information from said service request and said referenced said defined information service to a routing module.

5. The method of 4, wherein said routing module further comprises enabling a service oriented architecture to return said results of said data to said data request end-point in said format specified in said defined information service.

6. The method of claim 1, further comprising:
determining required security in said defined service; and
implementing said required security.

7. The method of claim 1, further comprising a creating a standard message mapping interface.

8. The system of claim 1, further comprising logging said service request.

9. The method of claim 1, wherein the parameters include English-language, non-computer coded instructions.

10. The method of claim 1, wherein the parameters further comprise:
an application identifier tag to denote an application name;
an ID address number for system identification;
a textual description of the information service for documentation purposes;
a source URI to define the location of the information service;
a source URI alias to mask a server address;
service routing modules;
a definition area to specify required data;
filter parameters to make the generated services reusable for differed data filter criteria;
standard name mapping for common message mapping;
a row tag name to specify a name tag for each returned row of information;
group access control list sources to specify secured user group access to the information service;
a service creator email address;
a generated URL service call; and
a cross reference listing of every component that calls the information service.

11. A system for a delivering a reusable framework, said system comprising:
an interface to define an information service within said reusable framework;
a metadata repository to store said defined information service and parameters of the defined information service, the parameters comprising:
a security authentication parameter for LDAP validation,
a security authorization parameter for entitlement to access specific data,
a security access control parameter, and
address identification parameters for the data sources; and
a service controller operative to
receive a service request as a URL address for invoking said defined information service, the URL address including a location of the defined information service and security tokens,
establish a data connection after receiving said service request wherein said defined information service can be invoked, and
automatically generate a web service in response to the service request based on the parameters of the defined information service in said metadata repository; and
a routing module, wherein said service controller established said data connections through said routing module, wherein said routing module returns resulting data to a requesting end-point in format specified in said service request, and wherein said routing module wraps a SOA wrapper around data sources to access the data sources, execute requests, and return the resulting data via SOA service calls, the SOA wrapper being wrapped around the data sources regardless of hosting format.

12. The system of claim 11, wherein said routing module is further operative to add additional functionality to said results of data to allow for new data formats.

13. The system of claim 11, wherein said service controller is further operative to determine the required security level and implementing said security level in said defined service.

14. The system of claim 11, wherein said routing module is further operative to create a proxy server.

15. The system of claim 11, further comprising a message mapping interface to standardize messages.

16. The system of claim 11, wherein said routing module is further operative to log usage of said reusable framework.

17. The system of claim 11, wherein the parameters include English-language, non-computer coded instructions.

* * * * *